UNITED STATES PATENT OFFICE.

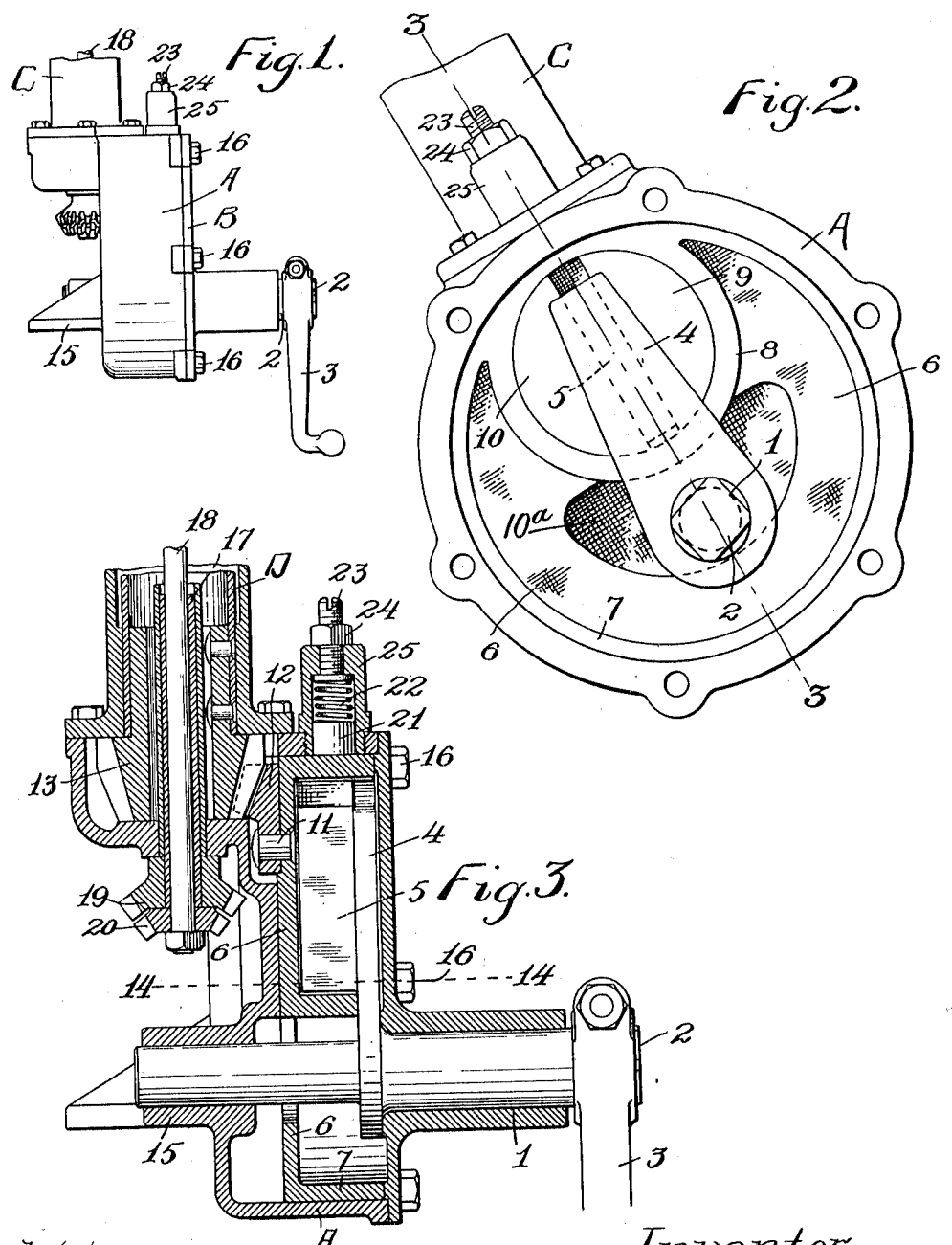

WALTER F. BROWN, OF WORCESTER, MASSACHUSETTS.

STEERING-GEAR.

1,102,239. Specification of Letters Patent. Patented July 7, 1914.

Application filed October 26, 1908. Serial No. 459,651.

*To all whom it may concern:*

Be it known that I, WALTER F. BROWN, a citizen of the United States, residing at Worcester, in the county of Worcester and Commonwealth of Massachusetts, have invented a new and useful Improvement in Steering-Gear, of which the following is a specification, accompanied by drawings forming a part of the same, in which—
Figure 1 represents one of my improved steering gears in elevation. Fig. 2 is a side view with the side or cap plate removed, and Fig. 3 is a central sectional view on the plane of the broken line 3—3, Fig. 2.
Similar reference letters and figures refer to similar parts in the different views.

My present invention relates to a steering gear for vehicles and especially for automobiles or other motor driven vehicles, and it has for its object to provide an efficient and simple steering gear in which the liability of lost motion due to excessive wear of the operating parts is greatly lessened, and I accomplish this object by the construction and arrangement of parts as hereinafter described and pointed out in the annexed claims.

Referring to the accompanying drawings A denotes a shell or case inclosing the operating parts of my steering mechanism, which is preferably cast in a single integral piece having one side closed by means of a removable cap B. Attached to the shell or case A is a flanged sleeve C which incloses a bearing for a steering shaft D. Journaled in the shell or case A is a rocking shaft 1, having a projecting polygonal end 2 adapted to receive the usual steering arm 3. Integral with the rocking shaft 1 is a radial arm 4 provided on one side with a blade 5. The interior of the case A is circular but eccentric to the axis of the rocking shaft 1, and inclosed in the case A and capable of a rocking motion therein is a disk 6 having a circular flange 7 at its outer edge fitting the interior wall of the case A, and also a circular flange 8 which incloses a circular recess containing the two segmental plates 9 and 10, the circular sides of which fit the interior wall of the flange 8 and their straight sides bear against the opposite sides of the blade 5 on the radial arm 4. The rocking disk 6 is provided with a semicircular opening 10ᵃ, which is concentric with the disk 6 and through which the rocking shaft 1 passes.

Attached to the upper edge of the disk 6 by means of rivets 11 is a curved toothed rack 12, which is concentric with the axis of the disk 6. The toothed rack 12 is in the form of a short circular arc and does not extend entirely around the disk 6. Engaging the toothed rack 12 is a beveled pinion 13 attached to the steering shaft D. The axis of the disk 6 is indicated in Fig. 3 by the broken line 14, 14.

The case A is provided with a flange 15 by which it is attached to the rigid framework of the vehicle and the open side of the case A is closed by the cap B and bolts 16. Inclosed concentrically within the steering shaft D are the shafts 17 and 18 connected with the beveled gears 19 and 20, respectively, which form part of the throttle and spark controlling mechanism. The periphery of the flange 7, forming a bearing for the disk 6, is preferably frictionally held by a friction plug 21, which is pressed against the flange 7 by a spiral spring 22, the force of which is regulated by an adjusting screw 23 and check nut 24. The spring 22 and friction plug 21 are inclosed in a shell 25.

The operation of my steering mechanism is as follows: The rotation of the steering shaft D through the beveled pinion 13 and curved rack 12 imparts a rocking motion to the disk 6 about its axis 14, 14. The disk 6 is held within the wall of the case A and revolves about a center on the line 14. As it revolves the relative movement between the disk 6 and the shaft 1 is provided for by the opening 10ᵃ, having its outer edge parallel with the circumference of the disk 6, and by the radial slot in the disk 6. The shaft 1 is held from revolution and is merely rocked about its axis by engagement with the disk 6. The disk 6 carries the segmental plates 9 and 10 inclosed within the flange 8 with their straight edges bearing against the blade 5. A rocking motion is given to the radial arm 4 and shaft 1 about the axis of the shaft 1, by the rocking movement of the disk 6 around its axis 14, producing a slight sliding movement between the sides of the blade 5 and the straight edges of the segmental plates 9 and 10, and also a slight rotative movement between the curved edges of the plates 9 and 10 and the inner wall of the circular flange 8. This slight movement between the edges of the plates 9 and 10 and the sides of the blade 5, and also between the outside of said plates and the flange 8, is between parts easily lubricated so that the liability of wear and lost motion is much lessened. Only the radial movement of the blade 5 is necessary for the operation of the device, and the rotary member held in the flange 8 is supplementary and merely to provide against excessive wear by allowing an additional amount of lubrication. The rocking motion of the shaft 1 is imparted to the steering wheels through the arm 3, and the usual steering connection with the axle of the vehicle. The bearing surfaces between the flanged disk 6 and the interior of the case A, and also the bearing surfaces between the blade 5, flange 8, and the segmental plates 9 and 10 may be thoroughly lubricated and at the same time protected from dust by the oil tight case A and cap B. Rotative movement of the steering arm 3, caused by jars or force applied to the wheels to move the flange 7 is resisted by the frictional contact of the flange 7 with the plug 21, and the amount of friction exerted by this plug is determined by the screw 23 acting upon the spring 22, so that wear of the plug may be compensated for and the amount of the frictional resistance against the rotation of the disk 6 by movement of the arm 3 may be regulated as desired. The amount of pressure exerted upon the flange 7 by the plug 21 is constant and depends upon the adjusting screw 23; but the amount of leverage exerted by the arm 3 to move the disk 6 is determined by the distance from the center of the shaft 1 to the axis of rotation of the disk 6, which is considerably less than the leverage exerted by the steering shaft through the toothed rack 12. The resistance of the friction plug may, therefore, be easily overcome when the steering shaft is turned but proves sufficient to prevent the movement of the disk 6 by the arm 3.

I claim,

1. A steering mechanism comprising a steering shaft, a rocking disk operatively connected with said steering shaft and having a semicircular concentric opening, a rocking shaft eccentric to said disk passing through said opening and having a radial arm and a steering arm, a circular flange having a diameter radial to said rocking disk and mounted thereon, and means rotatable within said flange and inclosed thereby, said rotatable means being arranged to engage said radial arm diametrically to said rotatable member, thereby transmitting the rocking movement of said disk to said rocking shaft.

2. A steering mechanism comprising a rocking shaft having a radial arm and a steering arm, a steering shaft, a rocking member operatively connected with said steering shaft, said rocking member having a circular flange inclosing rotatable means, said rotatable means being provided with parallel surfaces radial to said rocking shaft, and a blade on said radial arm arranged to be engaged by said parallel surfaces.

3. A steering mechanism comprising a rocking disk having a circular flange eccentric to the axis of said disk, a pair of segmental plates inclosed by said circular flange, a rocking shaft parallel with the axis of said disk and eccentric thereto, and a radial arm carried by said shaft having its free end inclosed by said segmental plates, whereby a rocking motion of said disk will be imparted to said shaft.

4. In a steering mechanism, a rocking shaft provided with a steering arm and a radial arm having a blade on one side, a rocking disk with its axis parallel to and eccentric to said rocking shaft, a fixed casing forming a bearing for said disk, a segmental rack attached to said disk, a steering shaft connected with said rack, a circular bearing in said disk eccentric to the axis of the disk and also to the axis of said rocking shaft, and segmental plates held in said circular bearing and contacting with the blade on said radial arm.

WALTER F. BROWN.

Witnesses:
PENELOPE COMBERBACH,
RUFUS B. FOWLER.

---

Copies of this patent may be obtained for five cents each, by addressing the "Commissioner of Patents, Washington, D. C."